Sept. 25, 1951    A. M. ALEXANDRESCU    2,569,087
ROTARY TURBINE-TYPE FLUID COUPLING Filed Dec. 11, 1948      5 Sheets—Sheet 4

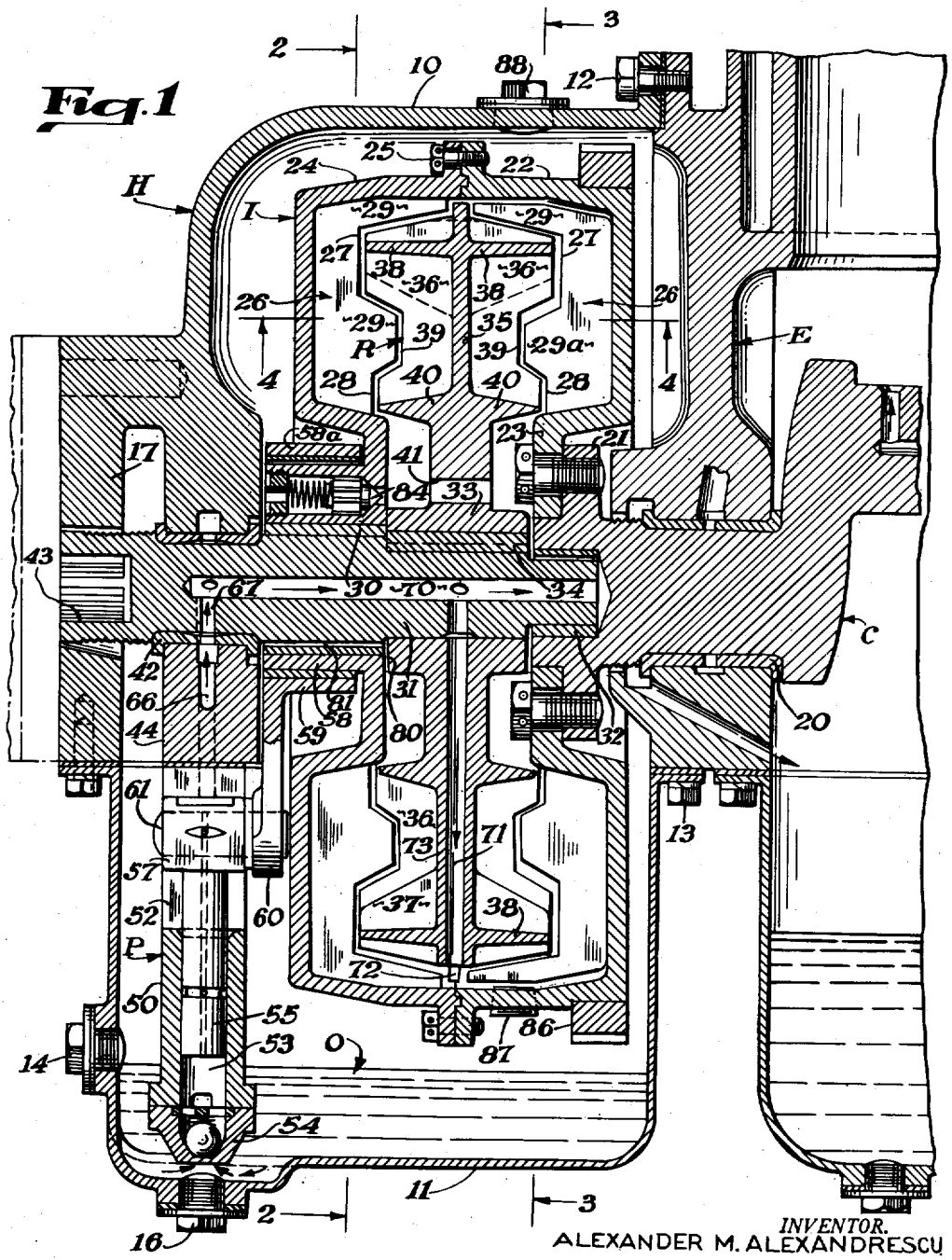

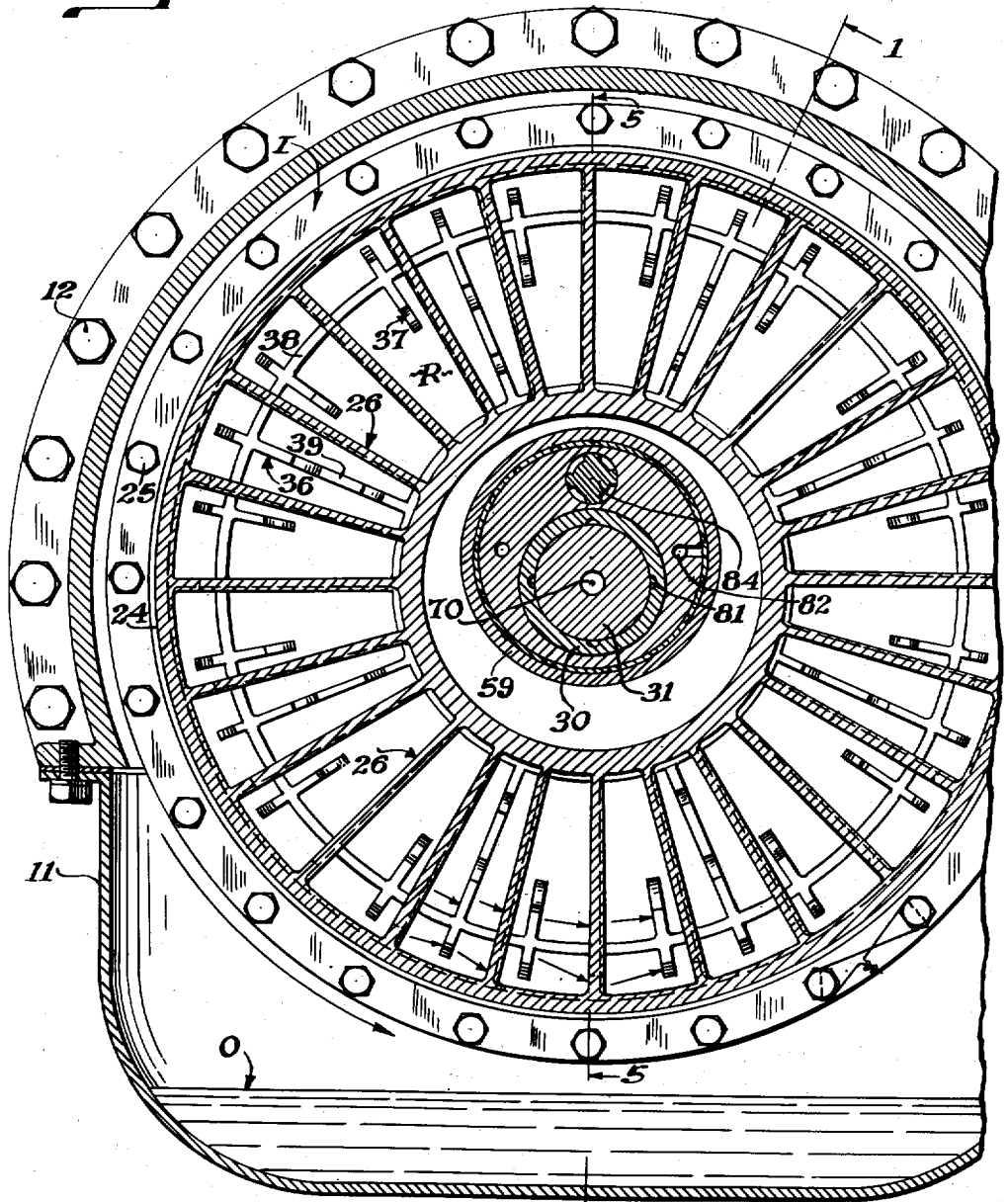

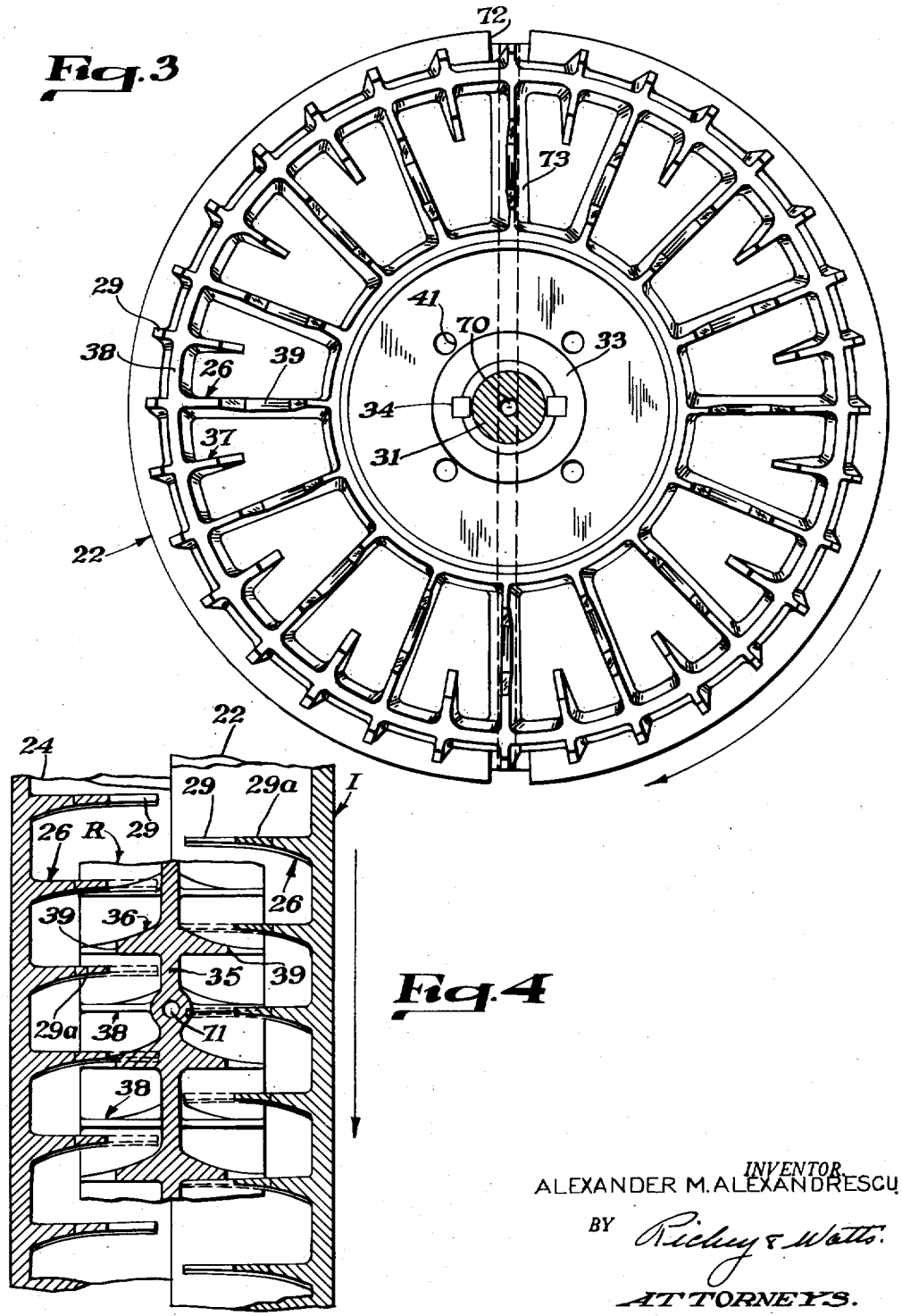

INVENTOR.
ALEXANDER M. ALEXANDRESCU
BY *Richey & Watts*
ATTORNEYS.

Patented Sept. 25, 1951

2,569,087

UNITED STATES PATENT OFFICE 2,569,087

ROTARY TURBINE-TYPE FLUID COUPLING

Alexander M. Alexandrescu, Cleveland, Ohio

Application December 11, 1948, Serial No. 64,739

6 Claims. (Cl. 60—54)

This invention relates to fluid couplings, and, more specifically, to fluid couplings employing a pair of relatively rotatable rotor elements, the driving element being an impeller which acts upon hydraulic fluid in the coupling to cause rotation of the driven rotor element or runner.

It is an object of the present invention to improve the characteristics of fluid couplings by providing a relatively high starting torque and by providing exceedingly smooth operation. These objects and advantages are accomplished in a preferred embodiment of my invention by a pair of concentric impeller and runner elements having generally radially directed blades, the edges of which pass in close relationship to one another. In the preferred embodiment, the free edges of the blades are formed with interfitting notches and projections that greatly augment the coupling action and forces.

Extreme smoothness of action is obtained by making the number of blades on the respective elements noncommensurate over a substantial arc, and smoothness of action is further augmented by staggering the rows of blades in at least two of the relatively movable elements.

Another object resides in producing a turbulent suction action created by the separation of the rearward faces of the blades from one another, which action augments the coupling between the rotors. In the preferred embodiment this object is readily attained by making the rearward blade faces flat and generally radial.

Another important object resides in reducing the slip and increasing the efficiency and firmness of the coupling at operating speeds. This is accomplished by connecting a pump between one of the rotor elements and a fixed housing, the pump which forces fluid from the housing into an enclosure formed by the rotor element. Escape for the fluid pumped into the impeller element is provided by a spring-loaded relief valve which opens at a relatively low pressure. The pump is arranged so that at low speeds it fills the chamber in the rotor element, but the pressure at such speeds can never exceed the setting of the relief valve. However, as speed increases the discharge capacity of the relief valve is not great enough to hold the pressure down to its set value and, therefore, pressure in the rotor element rises, which results in an increasingly firm coupling.

The manner in which these and other objects and advantages are attained will be understood from the following detailed description of a preferred embodiment of the invention.

In the drawings:

Fig. 1 is a vertical section through one form of the coupling;

Fig. 2 is a transverse section taken on 2—2 of Fig. 1; to simplify the drawings, Fig. 1 is taken on radii that are not 180° apart as indicated by 1—1 of Fig. 2;

Fig. 3 is an elevation of the runner element as seen along 3—3 of Fig. 1;

Fig. 4 is a fragmentary circumferential section at the radius of 4—4 of Fig. 1;

Figure 5:
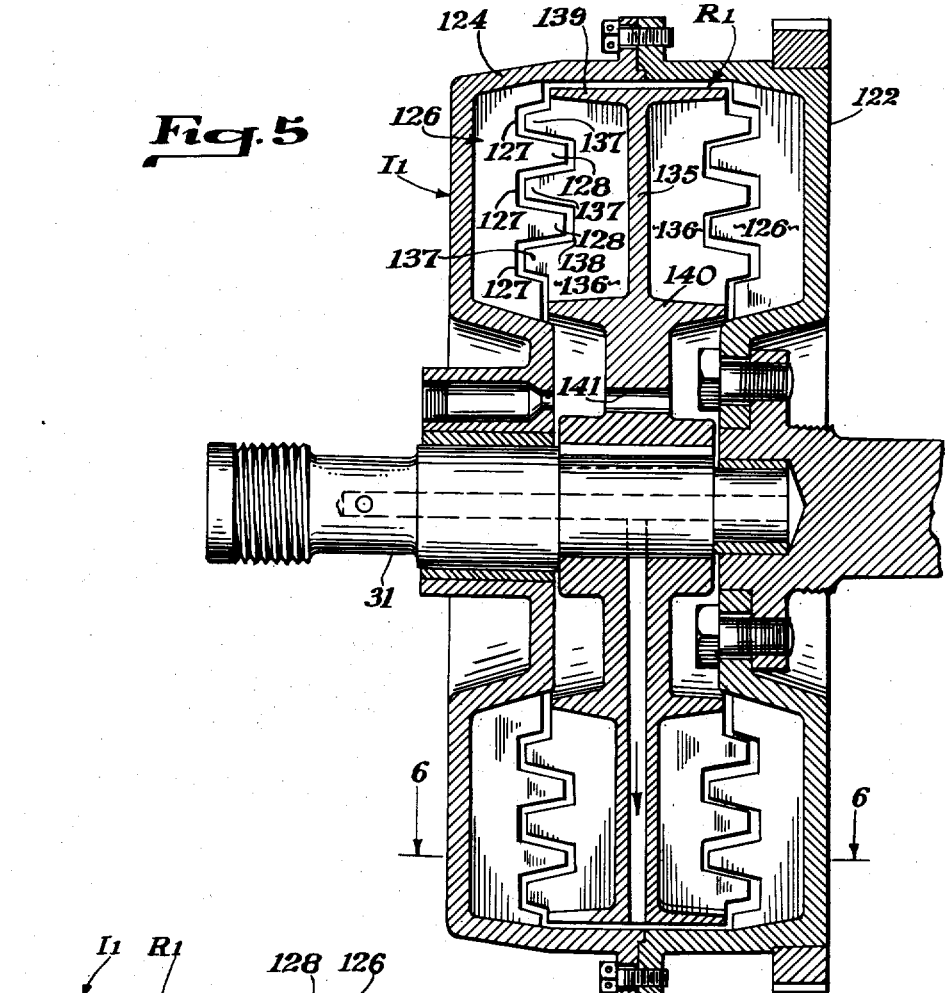
Fig. 5 is a vertical section through a modified runner and impeller assembly.

Referring to the drawings, the coupling comprises four major elements: an outer housing H; an enclosed impeller element I which is the driving element in a preferred form; a runner element R within the impeller element; and, a pump P associated with the housing and actuated by an eccentric upon rotation of the impeller element. The general construction of the housing and the pump P may be like that disclosed in my co-pending application, Serial No. 49,601, filed September 16, 1948.

As seen in Fig. 1 the fluid coupling may be mounted in an internal combustion engine E with its impeller element driven by the crank shaft C, although the invention is not limited to such an application.

Referring to the essential portions of the preferred form of Figs. 1 to 4 in more detail, the housing H comprises upper and lower elements 10 and 11, which may be fastened together and attached to an internal combustion engine by means of fasteners 12 and 13. An essential feature of the construction is that the housing H provides a fluid-tight reservoir for hydraulic fluid O, employed as the operating medium of the coupling. It will be understood that the operating fluid O may be oil or any other liquid, preferably of non-freezing nature, the service specifications for which are well known in the hydraulic coupling art. A filler plug 14 and the drain plug 16 are provided in accordance with good design practice. The upper section 19 of the housing may include a relatively heavy flange or plate 17 to which may be mounted a mechanical or other transmission that modifies the final output of the coupling and de-couples the parts when the prime mover is decelerated. Of course, the housing H is not fastened in place until the impeller and runner assembly is fitted.

In the illustrated application of the coupling, the engine crankshaft C is mounted in a rear main bearing 20, and the crankshaft includes a flange 21 to which the inner impeller section 22 is attached by means of an inwardly directed flange 23 and suitable cap screws.

After the runner R is assembled, the outer impeller section 24 is attached by means of cap screws 25. The impeller, in a preferred form, has opposed rows of blades 26. Each blade 26 is notched as at 27 and relieved as at 28 to form axially projecting fins 29 and 29a. The impeller is journalled at its out-board end by means of bushing 30 supported by the runner shaft 31. The inner end of the runner shaft is journalled in the crankshaft as at 32. The hub 33 of the runner R is keyed to the shaft 31 as at 34.

The runner R is fitted before assembly of the outer impeller section 24 and includes a radial web 35 separating rows of alternate long blades 36 and short blades 37, both sets being divided by circumferential webs 38. The long blades are notched as at 39 to receive projections 29a of the impeller blades. There is an inner circumferential flange 40 defining the inner limit of the runner blades. In order to provide for free distribution of the fluid at each side of the web 35, the latter may be apertured by means of plurality of bores 41 in the web. The outboard portion of shaft 31 is journalled in the housing section as at 42 and carries a splined portion 43 for connection with the driven element. Shaft 31 is retained in place by removable pillow block 44 and machine bolts.

As described in detail in my aforesaid pending application, in order to provide for a gradually increasing fluid pressure within by the impeller I as speed increases, a pump assembly P is provided. This assembly includes a cylinder block 50 made fast to the housing and slotted as at 52 to provide a crosshead guide. A cylinder bore 53 is formed in the body 50 and an end cap 54 is bolted to the body which mounts the inlet check valve. A piston 55 reciprocates within the cylinder bore and is guided by the squared crosshead member 57. In order to cause operation of the pump an eccentric 58 is formed on the outer impeller section 24 which drives the eccentric strap member 59, there being a bushing between the parts. The eccentric strap member 59 is connected with a crank arm 60, which drives the crosshead member 57 by means of a crank pin 61. The inlet check valve has been mentioned, and there is likewise provided in the pump body an outlet check valve (not shown) leading to the outlet passageway 66.

A bore 67 is formed in shaft 31 and communicates with an axial bore 70 in the runner shaft 31. Access to the interior of the impeller I, that is to the inner housing formed by impeller parts 22 and 24, is had by means of radial bores 71 formed in runner web 35. At the terminal portion of the bores 71, the radial vane disposed between the outer row of blades is notched as at 72 and portions of the web are enlarged as at 73 to provide a wall for the bores.

Means are provided for the egress of fluid and air from the housing formed by the impeller during normal operation. For example, the hub 33 of the runner R may be radially notched as at 80 which notches are in communication with axial notches 81 in the eccentric bushing 58a. These notches lead to a clearance space exterior of the impeller I so that fluid may return to the reservoir formed by the housing H.

The principal escape for the fluid pumped into the impeller element is provided by a spring-loaded relief valve 84 which opens at a relatively low pressure and provides communication between the interior of impeller I and that of housing H. The pump is arranged so that at low speeds it fills the chamber in the rotor element but the pressure at such speeds can never exceed the setting of the relief valve. However, as speed increases the discharge capacity of the relief valve is not great enough to hold the pressure down to its set value and therefore pressure in the rotor element rises which results in an increasingly firm coupling.

If the coupling is employed in conjunction with an internal combustion engine, the usual starting ring gear 86 may be mounted on the impeller housing part 22 for the rotation of the crankshaft by an elliptical starting motor.

The impeller housing may be filled with hydraulic fluid by aligning and removing filler plugs 87 and 88, or the pan may be filled through plug 14 and with the engine idling the pump will fill the impeller. The first method is preferred.

In operation, when the internal combustion engine or other driving motor means begins to rotate, the impeller I is driven and relative rotation between the impeller and the housing causes reciprocation of the pump piston due to the action of the eccentric. Fluid is rapidly pumped into the inner housing formed by the impeller and is flung outwardly from the hub 33 due to centrifugal force finding its way to the areas about the blades. The pump soon fills the impeller, and due to the action of centrifugal force on the hydraulic fluid any air trapped in the impeller is crowded toward the center and when pressure equals the setting for valve 84 the valve opens and air escapes. Air also escapes before valve 84 opens by means of passages 80 and 81, etc., as described in my copending application. If the coupling is employed in an automobile chassis, the valve 84 will preferably be set to open at about 5 p. s. i., and the discharge areas and pump capacity will be so related that pressure within the impeller element may rise to about 25 p. s. i. within a normal operating speed range.

When the fluid enters the spaces between the blades, a firm coupling is produced between the peripheral blade portions 29 of the impeller and the corresponding outer blade segments of the runner. Due to the alternate long and short blade construction there are more peripheral blade segments on the runner than on the impeller and a smooth, non-pulsating coupling is effected. In addition, there is a radial coupling caused by the interfitting of blade segments 29a and notches 39 on the alternate long blades. There is also a certain degree of lateral coupling between the blade edges, all of these cooperating to cause the runner to be effectively coupled to the impeller as speed increases. Since the number of blades over a substantial arc is not commensurate between the two rotor elements, the coupling or pick-up action between the elements is smooth and gradual and with a large number of blades and with the rows of blades on opposite sides of the impeller being staggered, an exceedingly smooth coupling action is produced. Stating it another way, it can be said that a very large number of power impulses is produced between the impeller and runner elements in this design.

By making the rearward faces of the blades relatively flat and generally radial, as these faces tend to separate from one another due to slip between the rotor elements, there is a tendency to create a suction between the separating blades as well as a turbulence which results in an increased coupling pressure being exerted on the driven or runner element. Thus, the configurations of the forward and rearward faces of the blades cooperate to produce a relatively high torque without requiring excessive slip to produce such torque.

As the speed of the coupling increases, the fluid pressure in the impeller element is increased and firmness of the coupling greatly augmented. Thus, the efficiency of the device as a coupling when operating at normal speed under normal load is very high. Of course, fluid is continuously returned to the housing by opening the check valve 84, and by leakage through ports 80 and 81, and port 82 in the eccentric flange.

Figure 6:
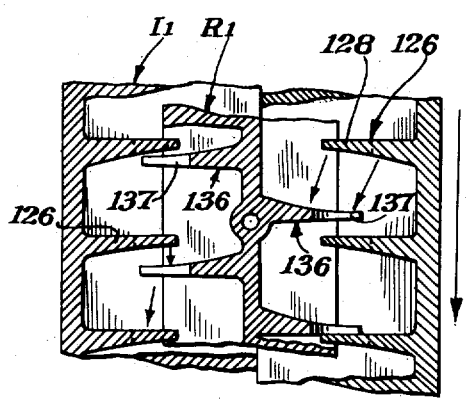
Fig. 6 is a fragmentary circumferential section on 6—6 of Fig. 5.
Figure 7:
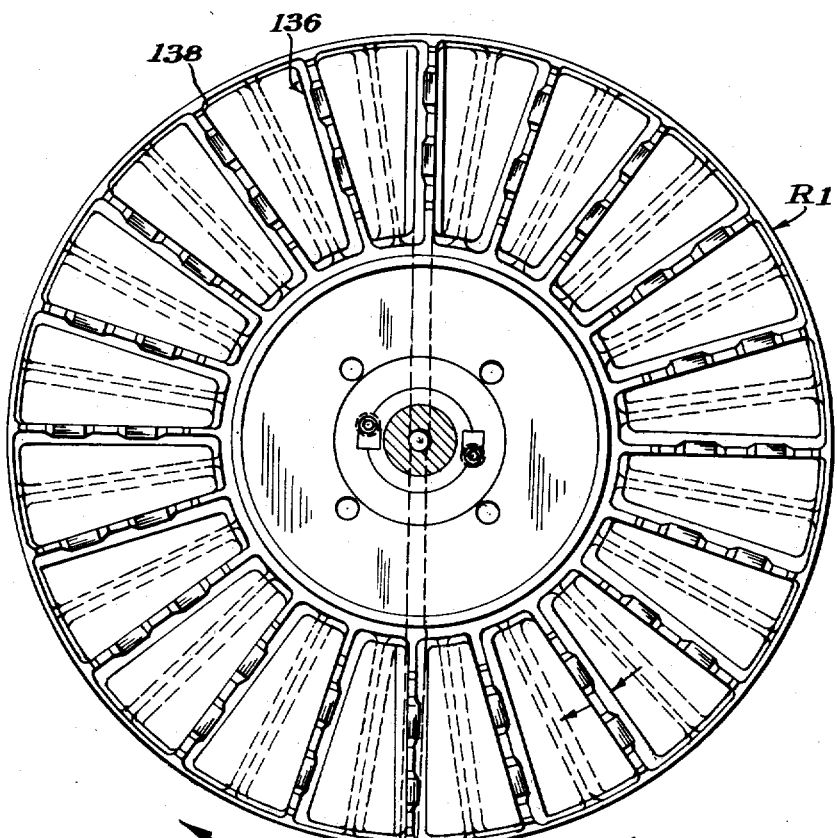
Fig. 7 shows the runner element of Fig. 5.

The form shown in Figs. 5 to 7 has the same general mode of operation as does the preferred form, but the construction of the impeller and runner vanes is somewhat different. The assembly of impeller $I_1$ and runner $R_1$, seen in Fig. 5, is mounted in a housing like that of Fig. 1 and functions generally in the same manner in the combination. However, the shape and arrangement of the blades or vanes is different. The impeller $I_1$ is formed of sections 122 and 124, each of which has blades 126 formed at their inner edges with a plurality of notches 127 and projections 128. Runner $R_1$ includes a dividing web 135 flanked by vanes 136 each having projections 137 and notches 138 complementary to and interfitting with the projections and notches of the runner blades. Blades 136 are surrounded by an outer peripheral flange 139 and an inner flange 140. As best seen in Fig. 6, blades 136 are staggered whereas blades 126 on the impeller are aligned. In this form, the coupling is quite firm due to the relatively large number of interfitting projections and yet the coupling is smooth because of the staggering of blades 136. It will be noted in Fig. 6 that like the device of Figs. 1 to 4, the modified coupling is arranged so that the number of blades on the runner and impeller are unequal which contributes to smoothness of operation.

Figure 8:
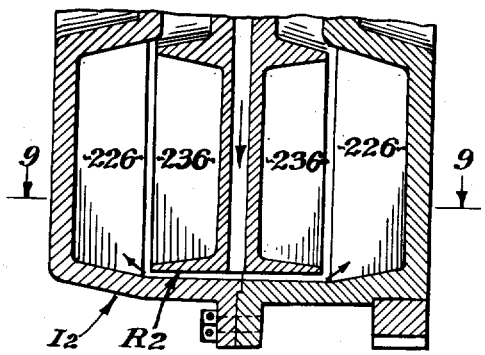
Fig. 8 is a fragmentary section of another form.
Figure 9:
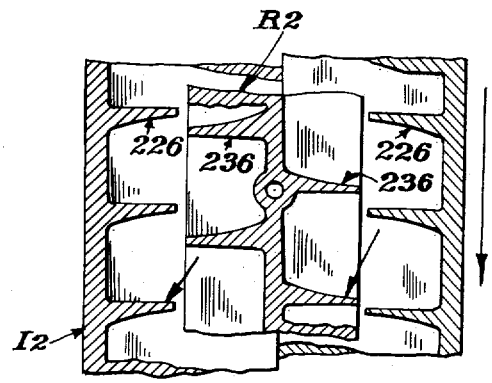
Fig. 9 is a partial section on 9—9 of Fig. 8.

The form shown in Figs. 8 and 9 is similar to that just described except that there are no interfitting projections on the blades. This decreases the coupling action at low speeds but the principle of operation is otherwise similar. In this form, impeller $I_2$ has two rows of radial blades 226 cooperating with staggered rows of blades 236 formed on the runner $R_2$. Again, the number of blades on the relatively moving elements are not equal to add smoothness to the operation.

It is a feature of the invention that all the parts are formed so that they may be readily produced by a casting or moulding process from suitable metals such as iron, aluminum, brass, etc., which eliminates costly machining operations.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A fluid coupling comprising an impeller element having two axially-spaced rows of radial blades and a runner element between said impeller blades and having a central flange and two axially oppositely directed rows of generally radially-directed blades, there being a relatively small clearance between the edges of adjacent rows of blades on the runner and impeller elements, the edges of said blades being configured sinuously to provide complementary interfitting elements, said edges being axially spaced a substantial distance from their points of attachment to provide a radially-uninterrupted flange to accommodate an unsheared body of fluid for fluid circulation.

2. A hydraulic coupling comprising aligned driving and driven shafts, a toroidal rotor element having axially spaced walls, one of said walls cooperating with one of said shafts to form a substantially closed working chamber, means connecting said toroidal rotor element to the other of said shafts, a radial flange mounted on said one shaft within the working chamber formed by said toroidal rotor element and axially spaced from at least one side of said element, generally radial blades on said one side of said toroidal rotor and on the opposed side of said flange, said blades extending axially toward one another and having closely fitting complementary sinuous edges, the edges of said blades being axially spaced a substantial distance from their respective points of attachment to the rotor and flange elements to provide a radially-uninterrupted flange to accommodate an unsheared body of fluid for fluid circulation.

3. A hydraulic coupling comprising aligned driving and driven shafts, a toroidal rotor element having axially spaced walls, one of said walls cooperating with one of said shafts to form a substantially closed working chamber, means connecting said toroidal rotor element to the other of said shafts, a radial flange mounted on said one shaft within the working chamber formed by said toroidal rotor element and axially spaced from at least one side of said element, generally radial blades on said one side of said toroidal rotor and on the opposed side of said flange, said blades extending axially toward one another and having closely fitting complementary sinuous edges, the edges of said blades being axially spaced a substantial distance from their respective points of attachment to the rotor and flange elements, and a circumferential axial flange on said radial flange forming the peripheral boundary of the blades thereon.

4. A hydraulic coupling comprising aligned driving and driven shafts, a toroidal rotor element having axially spaced walls, one of said walls cooperating with one of said shafts to form a substantially closed working chamber, means connecting said toroidal rotor element to the other of said shafts, a radial flange mounted on said one shaft within the working chamber formed by said toroidal rotor element and axially spaced from at least one side of said element, generally radial blades on said one side of said toroidal rotor and on the opposed side of said flange, said blades extending axially toward one another and having closely fitting complementary sinuous edges, the edges of said blades being axially spaced a substantial distance from their respective points of attachment to the rotor and flange elements, circumferential axial flanges on said radial flange forming the inner and outer peripheral boundaries of the blades thereon, and a circumferential flange on said rotor forming the inner boundary of the blades thereon.

5. A hydraulic coupling comprising aligned driving and driven shafts, a toroidal rotor element having axially spaced walls, one of said walls cooperating with one of said shafts to form a substantially closed working chamber, means connecting said toroidal rotor element to the other of said shafts, a radial flange mounted on said one shaft within the working chamber formed by said toroidal rotor element and axially spaced from at least one side of said element, generally radial blades on said one side of said toroidal rotor and on the opposed side of said flange, said blades extending axially toward one another and having closely fitting complementary sinuous edges, the edges of said blades being axially spaced a substantial distance from their respective points of attachment to the rotor and flange elements, a circumferential axial flange on said radial flange forming the peripheral boundaries of the blades thereon, outwardly directed radial blades on the outside of said circumferential flange and radially inwardly directed blades in said rotor element cooperating with said outwardly directed blades.

6. A fluid coupling comprising an impeller element having two axially-spaced rows of radial blade having inner generally radial portions with sinuous edges and peripheral axial portions, a runner element between said rows of impeller blades and having a central radial flange and inner and outer concentric annular flanges, two oppositely directed rows of blades extending radially between said annular flanges, two rows of radially outwardly directed blades extending from said outer annular flange, the inner row of runner blades having generally radial sinuous edges disposed closely to corresponding sinuous edges of the impeller blades, the outer row of runner blades having generally axially-extending edges closely disposed to corresponding edges of the axial impeller blade portions, the sinuous edges of said blades being axially spaced a substantial distance from their points of attachment.

ALEXANDER M. ALEXANDRESCU.

REFERENCES CITED

The following references are of record in the file of this patent:

UNITED STATES PATENTS

| Number | Name | Date |
|---|---|---|
| 2,240,270 | Schaefer | Apr. 29, 1941 |
| 2,266,086 | Sanderson | Dec. 16, 1941 |
| 2,318,660 | Barrett | May 11, 1943 |
| 2,379,183 | Price | June 26, 1945 |

FOREIGN PATENTS

| Number | Country | Date |
|---|---|---|
| 388,880 | Great Britain | Mar. 9, 1933 |

Certificate of Correction

Patent No. 2,569,087                                            September 25, 1951

ALEXANDER M. ALEXANDRESCU

It is hereby certified that error appears in the printed specification of the above numbered patent requiring correction as follows:

Column 8, line 1, for "blade" read *blades*; line 5, after "two" insert *axially*; and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*